(12) United States Patent
Bouru

(10) Patent No.: US 7,938,620 B2
(45) Date of Patent: *May 10, 2011

(54) TURBOMACHINE STATOR INCLUDING A STAGE OF STATOR VANES ACTUATED BY AN AUTOMATICALLY CENTERED ROTARY RING

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 971 days.

This patent is subject to a terminal disclaimer.

(21) Appl. No.: 11/763,181

(22) Filed: Jun. 14, 2007

(65) Prior Publication Data
US 2007/0292264 A1 Dec. 20, 2007

(30) Foreign Application Priority Data
Jun. 16, 2006 (FR) ...................................... 06 52528

(51) Int. Cl.
*F04D 29/44* (2006.01)
(52) U.S. Cl. ....................................................... 415/160
(58) Field of Classification Search .................. 415/160, 415/161
See application file for complete search history.

(56) References Cited

U.S. PATENT DOCUMENTS

| 3,841,788 | A | * | 10/1974 | Sljusarev et al. | 415/147 |
| 3,990,809 | A | * | 11/1976 | Young et al. | 415/160 |
| 4,035,101 | A | * | 7/1977 | Glenn | 415/160 |
| 4,130,375 | A | | 12/1978 | Korta | |
| 4,773,821 | A | * | 9/1988 | Gonthier et al. | 415/150 |
| 4,810,165 | A | * | 3/1989 | Greune et al. | 415/156 |

FOREIGN PATENT DOCUMENTS

| EP | 0 909 880 A2 | 4/1999 |
| EP | 1 672 180 A1 | 6/2006 |
| EP | 1 672 223 A2 | 6/2006 |

* cited by examiner

*Primary Examiner* — Edward Look
*Assistant Examiner* — Sean J Younger
(74) *Attorney, Agent, or Firm* — Oblon, Spivak, McClelland, Maier & Neustadt, L.L.P.

(57) ABSTRACT

The stator includes a casing and at least one stage of variable-pitch stator vanes. The vanes are moved by an actuator ring outside the casing and are carried thereby. The ring is connected by links to the vanes in order to actuate them simultaneously. The casing includes a stationary coaxial rail projecting from the outside surface of the casing and at least three circumferentially spaced-apart groups of wheels are constrained to move along the rail. Each group of wheels is coupled to the ring by a radial guidance arrangement. Each group of wheels includes at least two wheels engaged with the rail, and each wheel being mounted to rotate on a radially-oriented pin, said pin being mounted directly on said ring.

12 Claims, 6 Drawing Sheets

TURBOMACHINE STATOR INCLUDING A STAGE OF STATOR VANES ACTUATED BY AN AUTOMATICALLY CENTERED ROTARY RING

The invention relates to a turbomachine stator.

The invention applies to terrestrial or aviation turbomachines, in particular to airplane turbojets, and more particularly to the compressors included in such turbomachines.

BACKGROUND OF THE INVENTION

More precisely, the invention relates to a turbomachine of the type comprising a stator having a casing and at least one stage of variable-pitch stator vanes, said vanes being moved by an actuator ring outside said casing and carried thereby, said ring being coupled by links to said vanes of said stage in order to actuate them simultaneously.

In a turbomachine of this type, the stator of the compressor is fitted with at least one stage of stator vanes that are said to be of variable pitch since their position in the stream is adjustable. More precisely, the angle of attack of the vanes can be controlled as a function of the operating conditions of the turbomachine by a servo-control system that controls displacement of a rotary actuator ring outside the casing and connected to said vanes by respective links.

Conventionally, such an actuator ring has radially-adjustable centering shoes enabling it to be positioned around the casing by pressing thereagainst. Each centering shoe bears against a track on the casing, i.e. on a projection defined on the surface thereof, the projections being machined so that their contact surfaces are inscribed on a cylindrical surface of axis that coincides with the axis of the turbomachine.

The adjustments of the shoes enabling the ring to be made suitably coaxial with the casing are difficult to make and take time. In addition, once such adjustments have been made, it is necessary to give the sliding assembly a certain amount of clearance between the shoes and the projections in order to accommodate expansion phenomena that occur in operation and that involve dimensions varying differently for the ring and the casing. The ring and the casing have different coefficients of expansion, and in addition they are exposed to different operating temperatures. This operating clearance that is required can be as great as 0.7 millimeters (mm) to 0.8 mm, which goes against achieving the desired centering. When cold, this operating clearance is at a maximum, so the off-center position of the ring is therefore at its maximum.

In another design, U.S. Pat. No. 4,130,375 describes an actuator ring that moves circularly only, and that is made up of two superposed rings. The inner ring is mounted on the casing by means of studs projecting radially, and the outer ring that is attached to the vane actuator links runs on the inner ring via wheels. Such a system is heavy and bulky.

OBJECTS AND SUMMARY OF THE INVENTION

The invention provides a noticeable improvement in comparison with the above-mentioned prior art solutions, and, in operation, it enables the ring to be centered automatically while using a system that is relatively compact.

More precisely, the invention relates to a turbomachine stator of the above-mentioned type, wherein said casing includes a stationary coaxial rail projecting from the outside surface of the casing, wherein at least three circumferentially spaced-apart groups of wheels are constrained to move along said rail, wherein each group of wheels is coupled to said ring by a radial guidance arrangement (i.e. each group of wheels is guided radially relative to the ring), and wherein each group of wheels comprises at least two wheels engaged with said rail, each wheel being mounted to rotate on a radially-oriented pin, said pin being mounted directly on said ring.

The fact that the pin is mounted directly on the ring means that the pin is not mounted on a support that is in turn mounted to the ring. Two configurations can thus be envisaged.

In a first configuration, each wheel slides radially along its pin, and the pin is stationary relative to the ring. The pin may be mounted in stationary manner to the ring or it may be formed integrally therewith.

In a second configuration, each wheel is secured to its pin and the pin is mounted slidably in a bore formed in the ring, such that the wheel and the pin slide radially together relative to the ring. In other words, the pin is movable in radial translation relative to the ring, while the wheel is movable relative to the pin only in rotation (and not in translation).

Advantageously, in order to facilitate sliding of the pin in the bore, a smooth bearing or a rolling bearing is provided between the bore and the pin.

The structure in accordance with the invention makes it possible to obtain an actuator ring of low weight, and that is accurately centered (i.e. coaxial about the casing). In addition, assembly and adjustment of such a structure are simple and can be performed quickly. Finally, there is no need to provide operating clearance to accommodate expansion phenomena, thereby ensuring that the ring is properly centered regardless of the operating temperature, and in particular when cold.

The structure in accordance with the invention guarantees that the initial quality of centering is permanent, regardless of the operating temperature and regardless of the materials used for the ring and the casing. This improves control over the position of the actuator ring during all stages of control.

The system proposed can be satisfied with three (the minimum number) or four groups of wheels that are substantially equidistant from one another, circumferentially.

In order to turn the actuator ring, it is generally driven by control actuators, located at one or two points of its periphery. By means of the invention the drive forces needed are reduced by the amount needed in the prior art in order to overcome friction between the centering shoes and the projections, this amount constituting about 30% of the total drive force needed. The resulting saving can have repercussions on the size of the control actuator(s) or of any other control device.

Compared with the system described in above-mentioned U.S. Pat. No. 4,130,375, it can be seen that the weight and the dimensions of the actuator ring are greatly reduced since the inner ring of the system described in that patent is omitted.

In a possible variant, said rail is made up of two parallel rings secured to the casing, and said at least two wheels in each group of wheels come respectively into contact with the two rings. Each group of wheels generally comprises more than two wheels, and the wheels are distributed as equally as possible between the rings.

For example, the two rings are provided with facing lateral ribs and the groups of wheels comprise wheels, e.g. in the form of double cones, that are in engagement with said lateral ribs.

In another variant, said rail is constituted by a single ring secured to said casing, and the wheels in each group of wheels come into contact with said ring, on either side thereof.

As mentioned above, in order to turn the actuator ring, it is generally driven from one or two points of its periphery. Pivoting the variable-pitch vanes in their housings takes place with friction that can oppose such movement. This opposition has repercussions on the links, and in some cases can lead to elliptical deformation of the ring which is accompanied by (small) misalignment of the axes relative to the radial direction. To solve this additional problem, it is possible to act on the section of the ring so as to make it stiffer (improve resistance to deformation) and/or to act on the nature of the material constituting said ring, preferring to use materials presenting high stiffness. This applies in particular to certain composite materials based on carbon fibers.

The invention also provides a turbomachine provided with such a stator, in particular the invention provides a compressor with such a stator.

BRIEF DESCRIPTION OF THE DRAWINGS

The invention can be better understood and other advantages thereof appear more clearly in the light of the following description of an embodiment of the invention. The description is made with reference to the accompanying sheets of figures, in which.

MORE DETAILED DESCRIPTION

Figure 1:
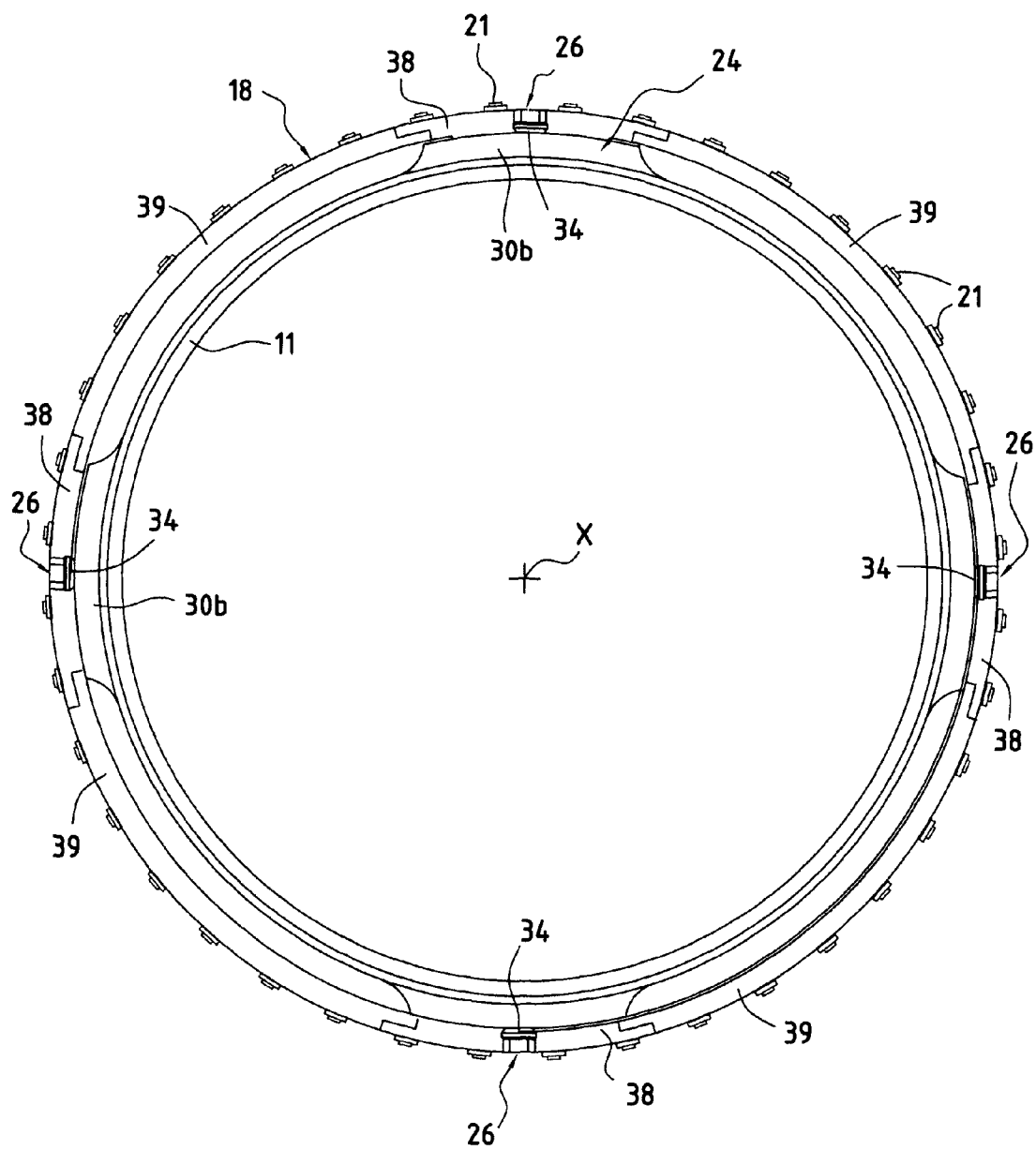
FIG. 1 is a view on a section of casing, perpendicular to the axis of the turbomachine, showing how an actuator ring is mounted around said casing.
Figure 2:
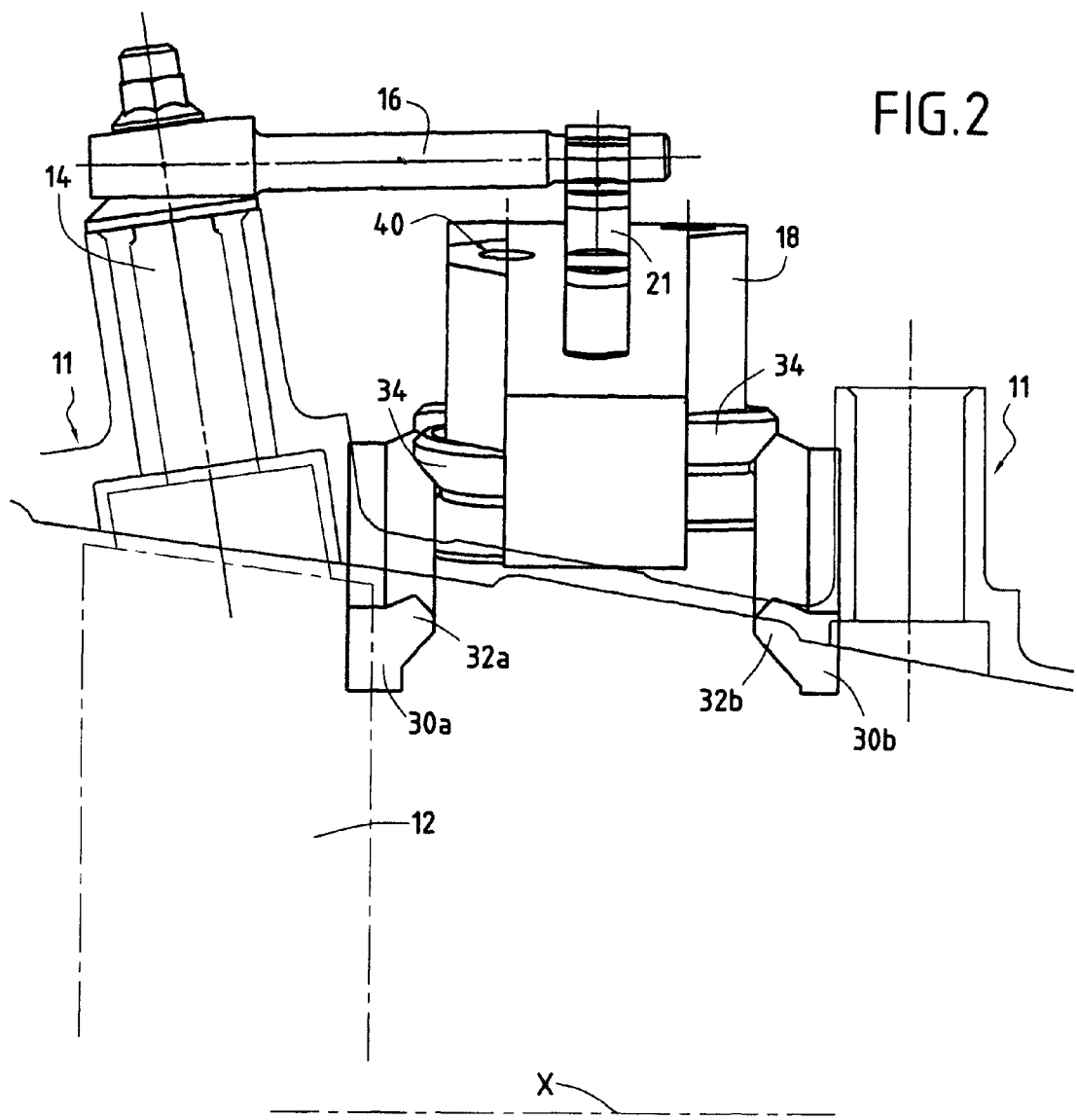
FIG. 2 is a side view in perspective showing a portion of the ring and of the casing of FIG. 1.
Figure 3:
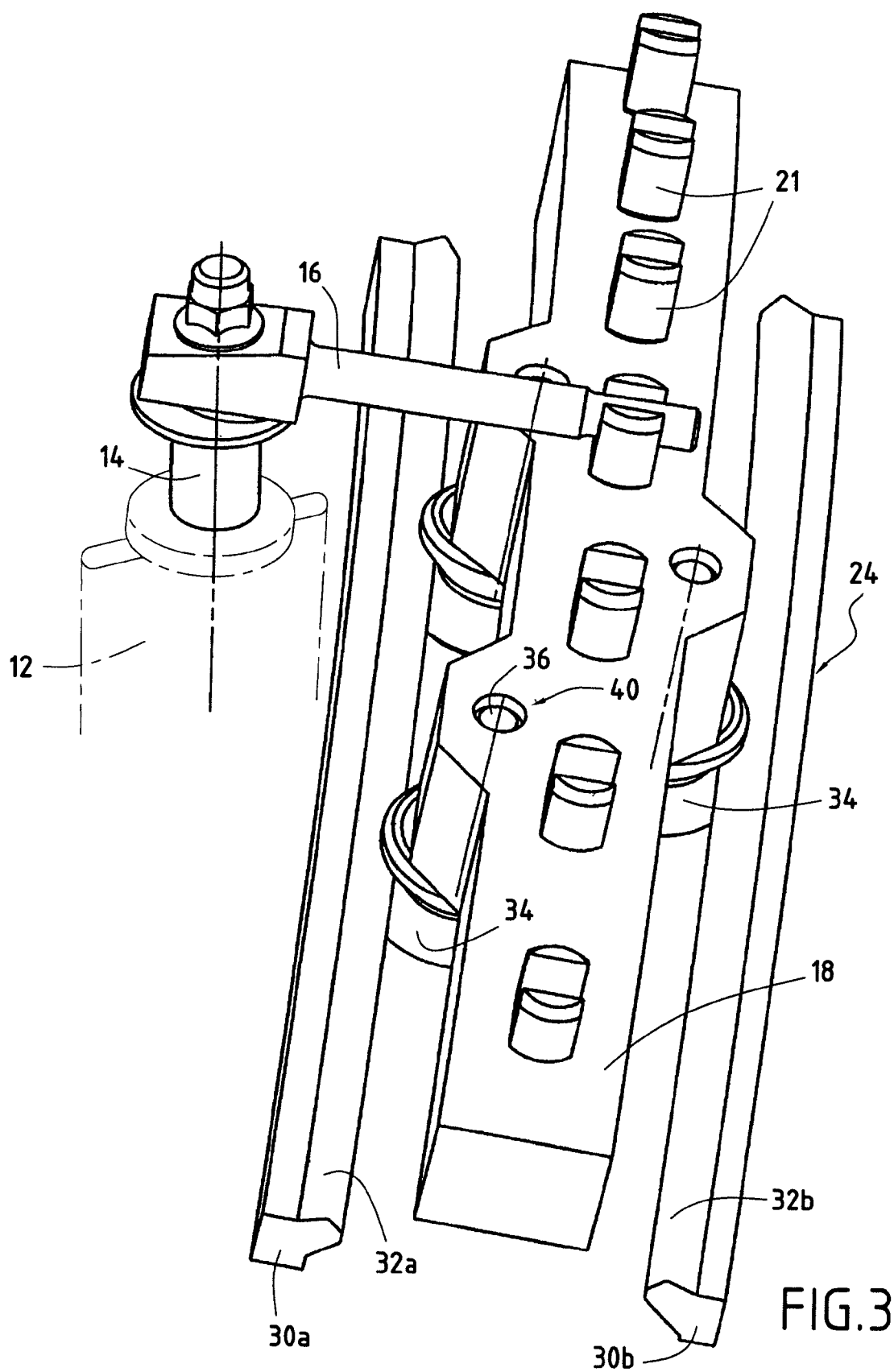
FIG. 3 is a plan view in perspective of a portion of the ring and the casing of FIG. 1.
Figure 4:
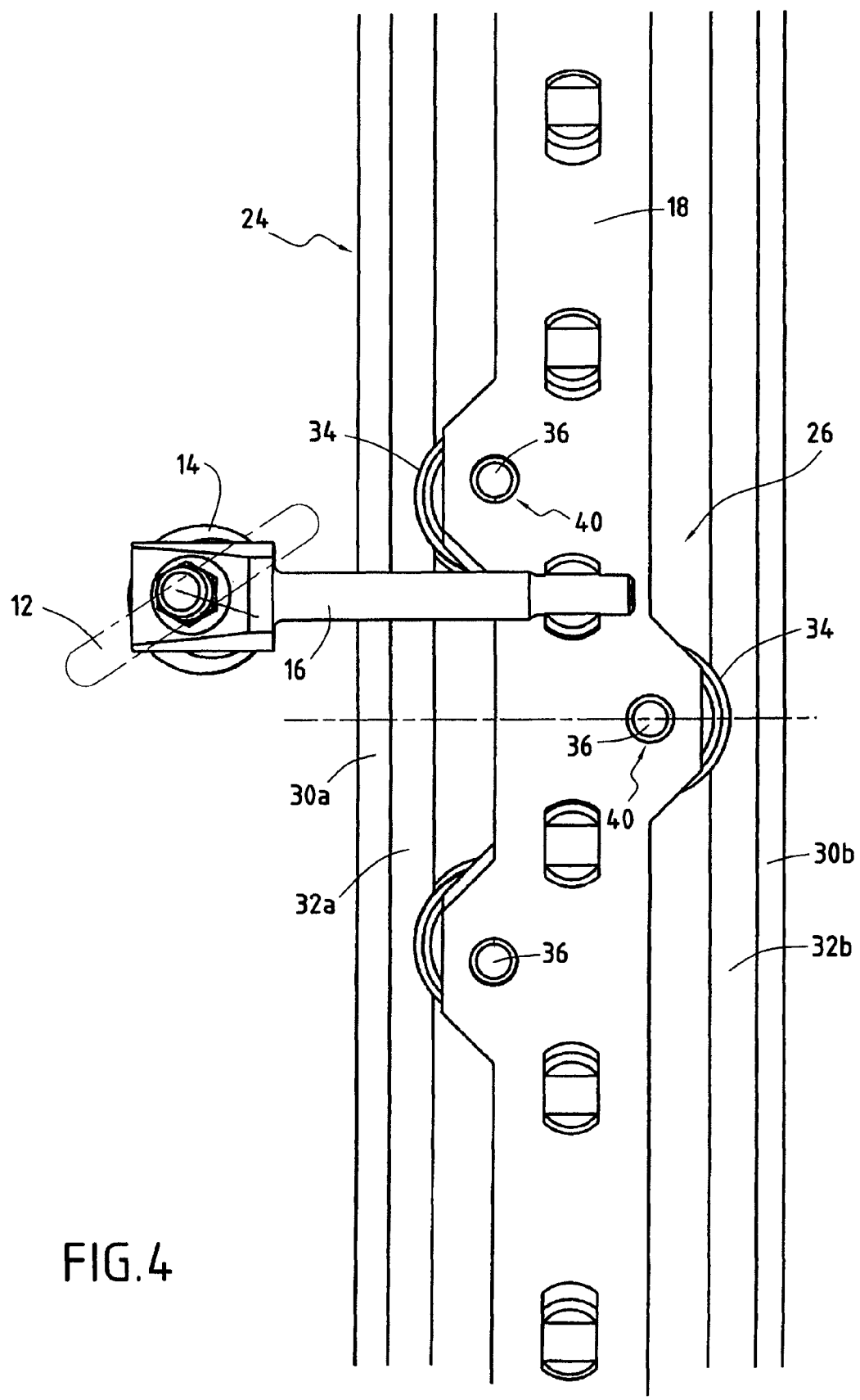
FIG. 4 is a plan view (looking from outside the ring towards the inside) showing a portion of the ring and of the casing of FIG. 1.
Figure 5:
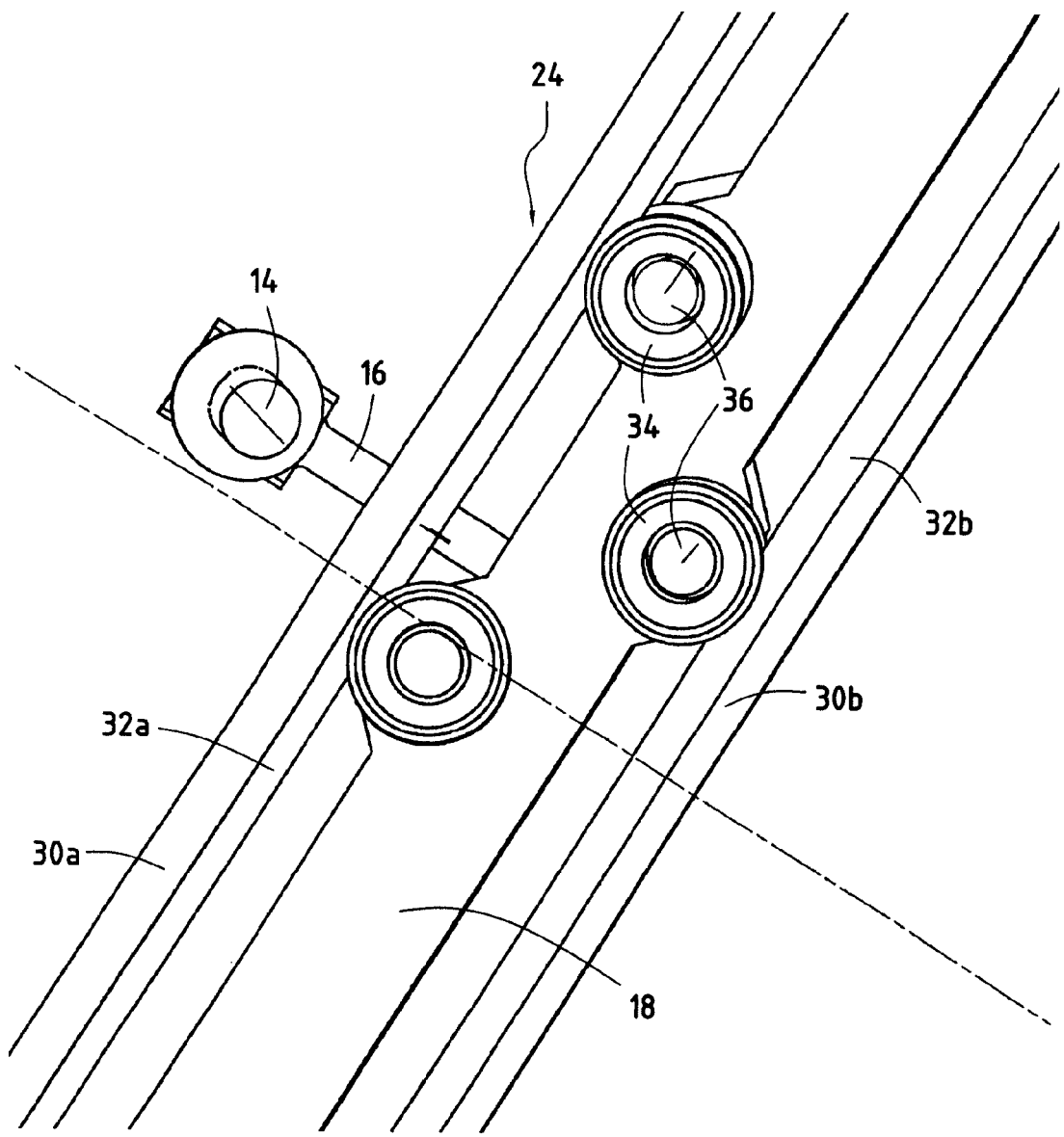
FIG. 5 is a view from beneath (from the inside of the ring looking towards the outside) showing a portion of the ring and of the casing of FIG. 1.

FIGS. 1 and 2 show a portion of a turbomachine casing 11 of axis X and housing variable pitch stator vanes 12. Each vane 12 has a pivot 14 projecting from the casing 11 and connected via a link 16 to an actuator ring 18 on the outside of the casing. On its outside surface, the ring 18 presents tenons 21 secured to the ends of the links 16. It can be understood that turning the actuator ring about the axis X causes the vanes 12 to pivot simultaneously through the same angle. In an airplane turbojet, the orientation of the vanes can be adjusted as a function of flying conditions.

The invention makes it possible to guarantee that the actuator ring 18 is centered, with said centering not being disturbed by differences in expansion between the casing 11 and the ring 18.

To do this, the casing 11 has on its outside a stationary coaxial annular rail 24, in this case formed integrally with the wall of the casing and projecting from its outside surface. At least three groups of circumferentially spaced-apart wheels 26 that are preferably substantially equidistant from one another are constrained to move along the rail 24. The rail is embodied completely only over those segments where it is functionally useful, i.e. along the paths followed by the groups of wheels 26 (see FIG. 1). The rail is omitted over other segments, thereby achieving a significant saving in weight and making it easier to put the groups of wheels into place. In addition, and as explained below, each group of wheels 26 is coupled to the ring 18 by a radial guide arrangement (i.e. each group of wheels is guided radially relative to the ring) that automatically ensures accurate centering of the ring 18 relative to the axis X of the turbomachine. In the example, four groups of wheels 26 are provided that are regularly spaced at 90° intervals relative to one another.

In the example of the figures, the ring 18 is made up of an assembly of a plurality of curved segments 38, 39 having flats at their ends and interconnected end to end, e.g. by crimping or by bolting so as to build up an annular structure (see FIG. 1). The segments 38 are those that carry the groups of wheels 26.

In the example being described, the rail 24 is made up of two parallel rings 30a, 30b (in fact ring segments) that are secured to the casing, and the groups of wheels 26 are shaped so as to move between these rings, more precisely between these ring segments. In addition, the two rings 30a, 30b are provided with lateral ribs 32a, 32b that face each other, and the groups of wheels 26 include double-cone wheels 34 that are in rolling engagement with the lateral ribs.

Figure 6:
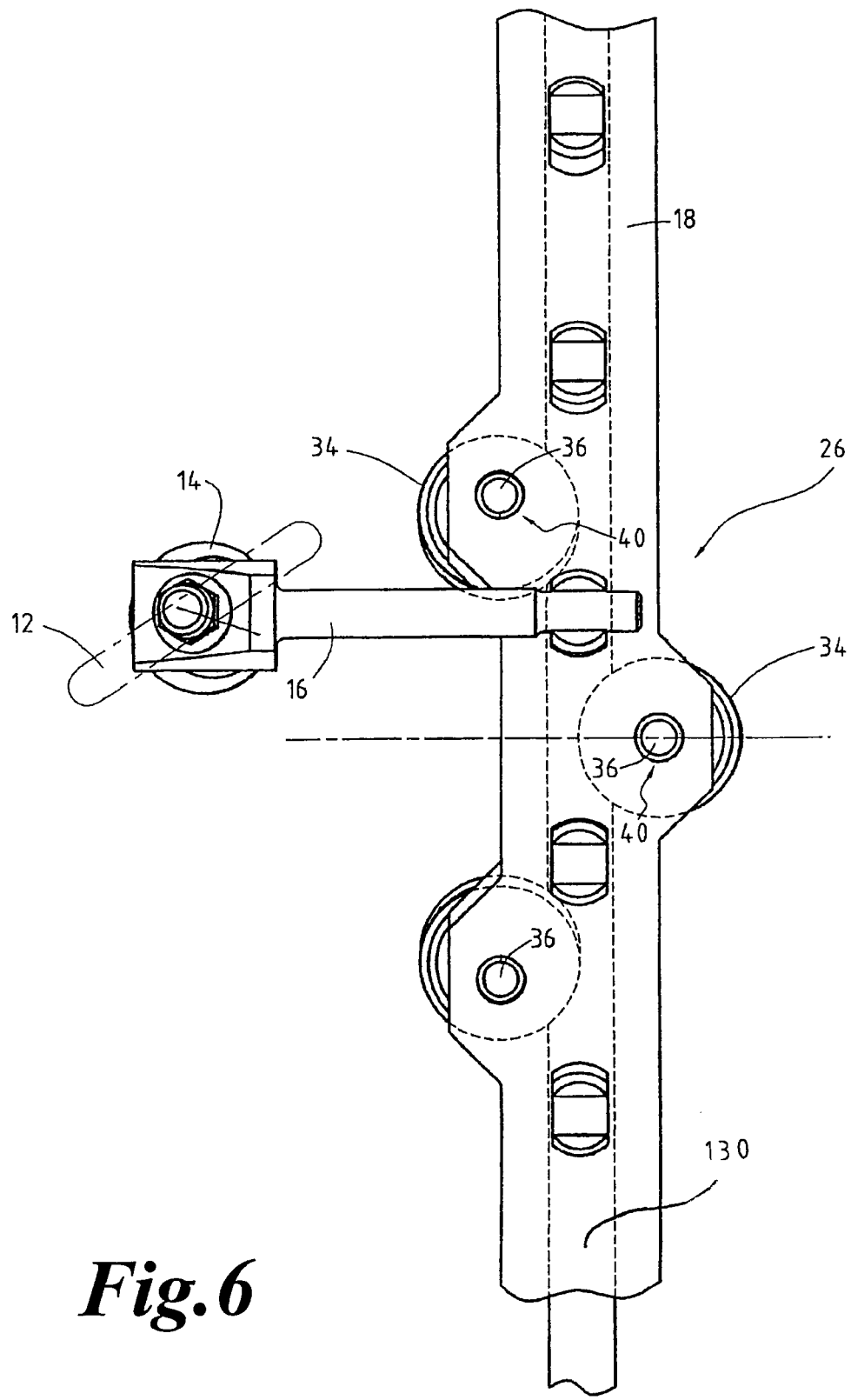
FIG. 6 is a plan view (looking from outside the ring towards the inside) showing another embodiment of a portion of the ring and of the casing.

In the example shown, each group of wheels 26 comprises three double-cone wheels 34, each wheel being mounted to rotate about a pin 36. The three wheels together form an isosceles triangle. One of the wheels 34 engages with one of the rings 30a, while the other two wheels 34 engage with the other ring 30b. In another embodiment shown in FIG. 6, one of the wheels 34 engages on one side of the ring 130, while the other two wheels 34 engage with the other side of the ring 130. In order to enable the wheels to turn, a bearing system is interposed between each wheel 34 and its pin 36. The wheels 34 cannot slide along the pins 36.

In another embodiment (not shown), the pins 36 are integral with the ring 18.

In the example shown, the pins 36 are slidably mounted in bores 40 of complementary shape formed in the ring 18. These bores 40 extend radially so that the pins 36 are oriented radially and slide radially relative to the ring 18.

In order to make it easier for each pin 36 to slide in its bore 40, a smooth bearing or a rolling bearing is provided between the pin and the bore.

For a rolling bearing, it is advantageous to use a ring with recirculating balls. It would also be possible to use a ball cage mounted on a damper system allowing the ball cage to move radially.

For a smooth bearing, it is advantageous to use a bushing placed between the bore and the pin. It is also possible to use a coating deposited on the surface of the bore and/or on the surface of the pin. Naturally, the material of the bushing and/or of the coating is selected for its low coefficient of friction.

In general, when the temperature rises in operation, the expansion of the casing is greater than the expansion of the ring 18, so the diameter of the rings 30a and 30b increases faster than that of the ring 18. By means of the invention, the rings 30a and 30b take with them the wheels 34 and the pins 36 that then slide inside the bores 40 in an outward direction relative to the ring. Thus, the ring 18 which was centered before expansion continues to be centered after expansion.

What is claimed is:

1. A turbomachine stator comprising:
   a casing; and
   at least one stage of variable-pitch stator vanes, said vanes being moved by an actuator ring located outside said casing and carried thereby, and said ring being connected by links to the vanes in order to actuate them simultaneously,
   wherein said casing includes a stationary coaxial rail projecting from the outside surface of the casing, wherein at least three circumferentially spaced-apart groups of wheels are constrained to move along said rail, wherein each group of wheels is coupled to said ring by a radial guidance arrangement, and wherein each group of wheels comprises at least two wheels engaged with said rail, each wheel being mounted to rotate on a radially-oriented pin, said pin being mounted directly on said ring.

2. The stator according to claim 1, wherein each wheel slides radially on its pin, said pin being stationary relative to the ring.

3. The stator according to claim 1, wherein each wheel is secured to its pin, the pin being slidably mounted in a bore formed in the ring so that the wheel and the pin slide together radially relative to the ring.

4. The stator according to claim 3, wherein a smooth bearing is provided between said bore and said pin to facilitate sliding of the pin.

5. The stator according to claim 3, wherein a rolling bearing is provided between said bore and said pin to facilitate sliding of the pin.

6. The stator according to claim 1, wherein a rolling system is interposed between each wheel and its pin.

7. The stator according to claim 1, wherein said rail is made up of two parallel rings secured to the casing, and wherein said at least two wheels of each group of wheels come into contact with the two rings respectively.

8. The stator according to claim 7, wherein the two rings are provided with lateral ribs facing one another, and wherein said groups of wheels comprise double-cone wheels in engagement with said lateral ribs.

9. The stator according to claim 1, wherein said rail comprises a single ring secured to said casing, and wherein the wheels of each group of wheels come into contact with said ring, on either side thereof.

10. The stator according to claim 1, wherein said actuator ring is made of a composite material based on carbon fibers.

11. A compressor including a stator according to claim 1.

12. A turbomachine including a stator according to claim 1.

* * * * *